March 24, 1953 A. BAKST ET AL 2,632,579
PRESSURE COOKER
Filed Aug. 20, 1946 2 SHEETS—SHEET 2

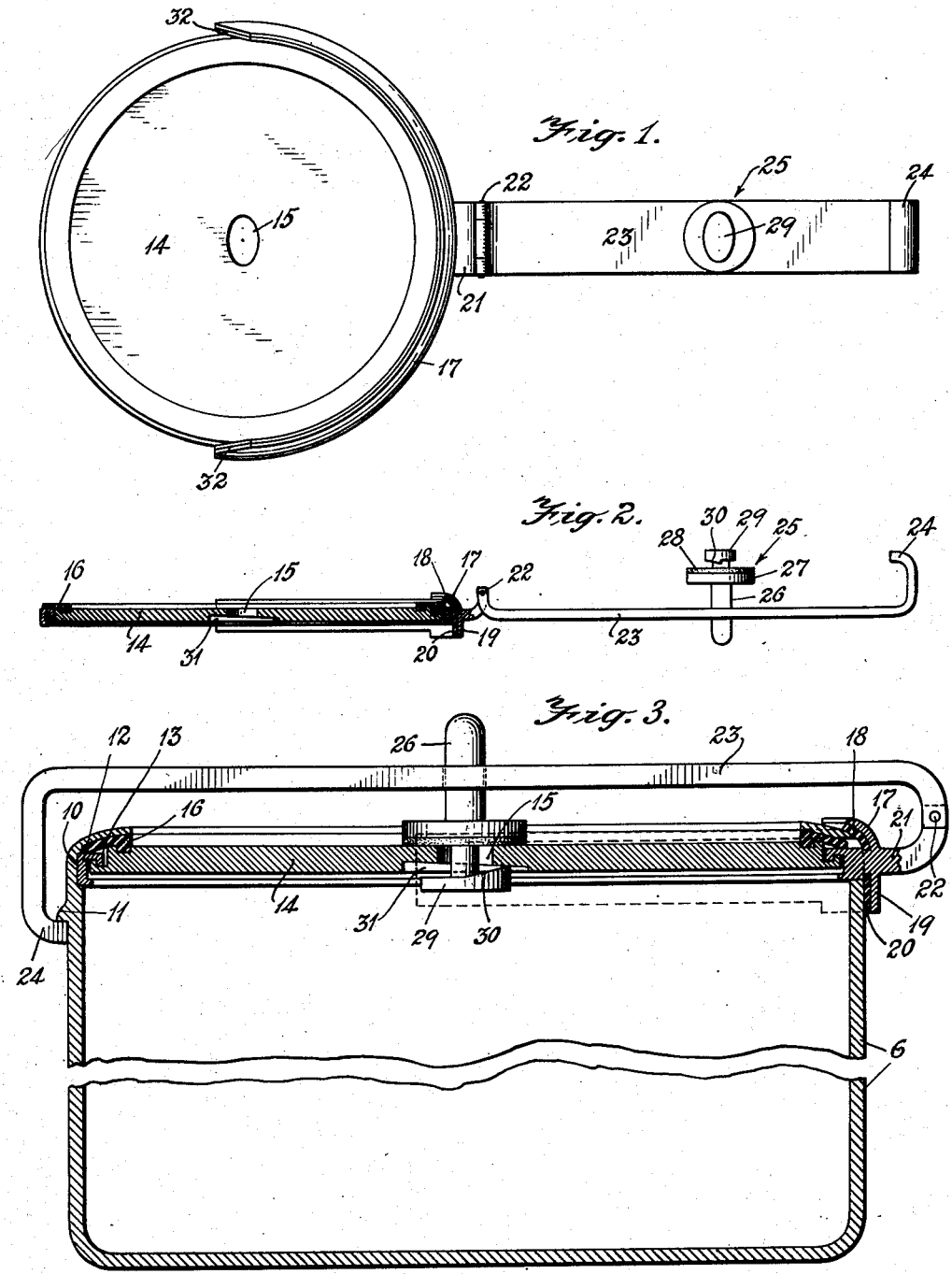

INVENTORS
AARON BAKST
SIMON L. RUSKIN
BY
ATTORNEYS

Patented Mar. 24, 1953

2,632,579

UNITED STATES PATENT OFFICE 2,632,579

PRESSURE COOKER

Aaron Bakst and Simon L. Ruskin,
New York, N. Y.

Application August 20, 1946, Serial No. 691,805

11 Claims. (Cl. 220—25)

The invention relates to a culinary appliance and specifically to a pressure cooker.

The primary object of the invention is to provide a device of this general character which is extremely efficient in operation and is capable of utilization by the housewife with extreme facility in preparing the utensil, after the food to be cooked has been placed therein, for the application of the cover to the cooker to hermetically seal the vessel to effect the pressure cooking process.

In its broadest aspect, our invention consists in the provision of a pressure cooker having a novel construction of cover or sealing arrangement whereby the utilization of the pressure cooker by the housewife is greatly facilitated and the appliance may be efficiently used.

Figure 4:
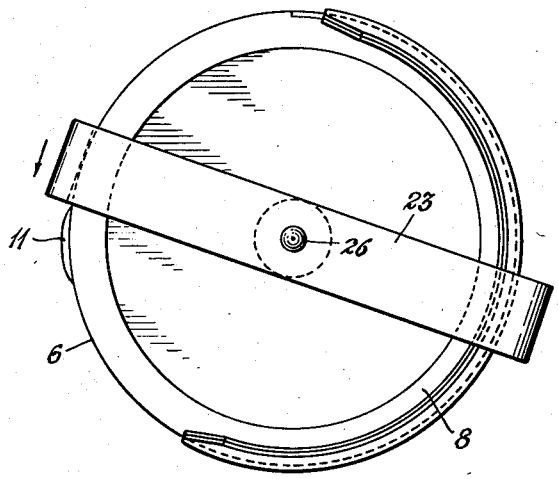
Figure 5:
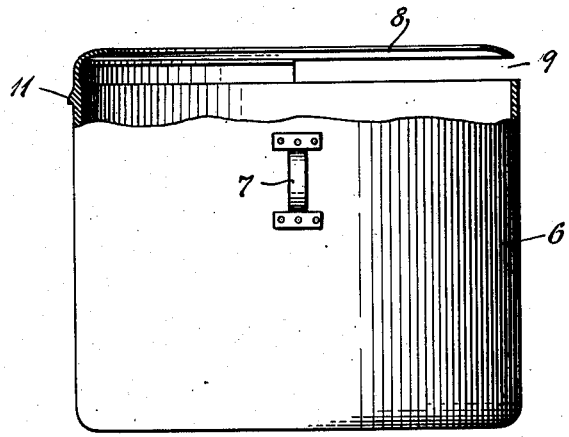

A specific embodiment of our invention is illustrated in the accompanying drawings, in which Fig. 1 is a top plan view of the cooking vessel covering top plate and locking bar therefor; Fig. 2 is a vertical section through such top plate; Fig. 3 is a vertical section through the pressure cooker with the covering top plate applied to the cooking vessel and secured in position thereon for the pressure cooking operation; Fig. 4 is a top plan view showing the application of the covering top plate to the vessel; and Fig. 5 is a front elevation of the pressure cooker partly in section prior to the application thereto of the covering top plate.

Referring more specifically to the drawings, in which similar reference characters identify similar parts in the several views, our novel pressure cooker comprises a receptacle or cooking vessel 6 of any conventional configuration and size which may be of sheet metal, having a handle 7 and a top or circumferential lip 8. The vessel 6, at a point immediately below the arcuate peripheral edge of the top or lip thereof is provided with a lateral opening extending substantially throughout one half of the circumference of the vessel, the remaining circumference of the interior vessel, in line with the open edge having a circumferential groove 10.

The cooking vessel 6 at its side opposite the center of the open edge is provided with an outwardly extending flange 11 having a cam surface and a right-angled lower edge for receiving the lip of the securing bar of the cover plate assembly as hereinafter described. Within the groove 10 is adapted to be seated an angle lining 12 of the cover plate assembly, the lining having an interiorly extending depending flange 13.

The cover plate assembly, as shown in Figs. 1 and 2, includes also a cover plate 14 having a centrally disposed elliptical opening 15, and a circumferential groove within which is secured a rubber ring or gasket 16 which is shaped so as to engage to the inside of the upper edge of the cooker in vapor-proof manner for effecting sealing thereof.

The angle lining 12 of the cover plate assembly has a ledge 17 extending substantially throughout one half of its circumference, with a rubber lining 18 within the interior surface thereof. The ledge 17 has a depending flange 19 which in turn has a rubber lining 20 which is adapted to bear against the side wall of the cooking vessel.

The ledge 17, approximately at its center, has a laterally extending ear 21 curving slightly upwardly, to the extremity of which is secured the hinge 22 of the transverse locking bar 23, the opposite end of which terminates in an arcuate lip 24. The plate 14 is loosely positioned in the angle lining 12 and the latter is manually rotatable relative to the plate by way of the bar 23.

Mounted in the bar 23 at a point so as to coincide with the position of the elliptical opening 15 in the cover of the vessel, is the valve structure generally designated as 25.

As shown in Fig. 3, the valve structure 25 passes through the elliptical opening 15 of the locking bar 23 approximately at its mid-point. Such valve structure comprises a tubular body 26 rigid with the bar 23 and having the conventional outlet and spring and a ring 27 having a rubber facing 28 on one side thereof and at the end of the valve opposite the outlet an elliptical-shaped member 29 to fit the elliptical aperture 15 in the cooker cover plate. The member 29 is provided on one side thereof with a cam surface 30 which, when the valve is in position upon the cooker, after closure thereof as hereinafter described, is adapted to ride on the slanting surface of a recess 31 in the center of the lower face of the cover plate.

In the utilization of our novel pressure cooker, the vessel 6 is filled with the food to be subjected to heat under pressure and the cover plate assembly, with the locking bar 23 thereof in extended position as shown in Fig. 2, is slid into position to constitute the covering for the vessel, through the transverse opening or slot 9. When the cover plate has been slid completely into position, the locking bar 23 is turned upon its hinge 22 to the position of such locking bar illustrated in Fig. 4, with the elliptical portion or member 29 of the valve structure passing through the elliptical aperture 15 of the cover plate. To facilitate the entry of the cover plate through the slit 9 and its proper seating in the groove 10 near the upper periphery of the cooking vessel, the ledge 17 of the covering plate is chamfered as shown at 32.

Thereupon, the locking bar 23 is rotated slightly in the direction of the arrow in Fig. 4 and relative to the plate 14 until the hooked nose or lip 24 of the bar is engaged by the straight transverse lower edge of the flange 11 of the vessel. During this rotation of the bar the cover plate 14 is held satisfactory and the cam 30 of the elliptical element 29 of the valve structure will ride upon the slanting surface of the recess 31 causing the slight upward movement of the entire cover plate 14 from the position thereof illustrated in Fig. 2 to its position illustrated in Fig. 3, in which latter position it has been pushed upwardly by the cam action to a sufficient extent to deform the rubber ring 16 and to bring it into contact with the depending flange 13 of the cover plate structure and thereby effect a hermetic sealing of the cover plate with the cooking vessel.

When the pressure cooking operation has been completed, it is only necessary for the housewife to again rotate the locking bar in the opposite direction, to disengage the lip 24 of the locking bar from the flange 11, thereby lowering the cover plate from its hermetic sealing position by the operation of cam 29, turn the locking bar upon its hinge 22, and withdraw the whole cover plate assembly from the vessel through the opening 9.

While we have described and illustrated a specific embodiment of our invention, it is obvious that various changes therein, particularly in the arrangement and configuration of the several parts thereof, may be made without departing from our invention.

We claim:

1. A culinary appliance constituting a pressure cooker, comprising a cooking vessel of sufficient body thickness to withstand pressure greater than atmospheric, a partially circumferential slot near the upper surface thereof, a cover plate assembly for said vessel and including a cover plate slidably contained in said slot, and a locking bar hingedly secured to said cover plate assembly at one edge thereof and extending in locked position over the entire width of said cover plate and vessel.

2. A culinary appliance as claimed in claim 1 in which the cover plate is provided with an elliptical aperture, and with a recess having an inclined surface in the lower surface of said cover plate, and cam means depending from said locking bar, when it is in vessel closing position, to position the cover plate tightly against the vessel.

3. A culinary appliance as claimed in claim 1, in which the cover plate has a centrally disposed elliptical aperture and the locking bar is provided with a valve structure adapted to pass through said elliptical aperture, and means on said valve structure to position the cover plate tightly against the vessel.

4. A culinary appliance constituting a pressure cooker comprising a cooking vessel having a circumferential top lip, a slot in said vessel near the top thereof and extending for part of the circumference thereof, a cover plate assembly for said vessel slidably receivable in said slot and including a cover plate and a locking bar hingedly secured to said cover plate assembly, and means for raising the cover plate, when positioned within the vessel, into engagement with the circumferential lip of the vessel.

5. A pressure cooker as claimed in claim 4, in which the cover plate has a centrally disposed elliptical aperture and a recess having an inclined inner surface, and the locking bar is provided with a valve structure adapted to pass through said elliptical aperture, and means on said valve structure to position the cover plate tightly against the vessel, said means comprising a cam secured to the end of the valve adapted to cooperate with said inclined surface to move said cover plate upwardly into engagement of its peripheral edge with the peripheral lip of the cooking vessel.

6. A pressure cooker as claimed in claim 4, in which the cover plate has a centrally disposed elliptical aperture and the locking bar is provided with a valve structure adapted to pass through said elliptical aperture, and means on said valve structure to position the cover plate tightly against the vessel, said means comprising a cam secured to the end of the valve adapted to cooperate with an inclined surface on the bottom of the cover plate to move said cover plate upwardly into engagement of its peripheral edge with the peripheral lip of the cooking vessel, and a circumferential gasket disposed between the peripheral edge of the cover plate and the inner peripheral edge of the cooking vessel.

7. A culinary appliance constituting a pressure cooker, comprising a cooking vessel having a circumferential lip throughout its upper edge and having a slot near its upper edge extending for part of the circumference thereof, a cover plate assembly slidably receivable in said slot and including a cover plate and a locking bar hingedly secured to said cover plate assembly, said vessel having a flange at the side thereof opposite from that through which the cover plate assembly is applied thereto, for receiving the end of the locking bar, and means for raising the cover plate, when positioned within the vessel, into engagement with the circumferential lip of the vessel.

8. A pressure cooker comprising a cooking vessel having a slot near the upper edge thereof and extending for part of the circumference thereof, a cover plate assembly slidably receivable in said slot and including a cover plate and means for locking said cover plate assembly in position upon the vessel, said means comprising a bar hingedly secured to said cover plate assembly, means mounted within said bar for raising the cover plate into engagement with the upper edge of the vessel, and means for effecting hermetic sealing of said cover plate and comprising a circumferential lip on said vessel and a resilient lining disposed between said lip and said cover plate.

9. A pressure cooker comprising a cooking vessel having a slot near the upper edge thereof and extending for part of the circumference thereof, a cover plate assembly including a cover plate slidably receivable in said slot, means for locking said cover plate assembly in position upon the vessel, and means for effecting hermetic sealing thereof and comprising a lip, and a resilient lining disposed between said lip and the cover plate, said cover plate having a centrally disposed elliptical aperture, the locking means comprising a locking bar provided with a valve structure adapted to pass through said elliptical aperture and means on said valve structure acting on rotation thereof to position the cover plate tightly against the vessel.

10. A pressure cooker comprising a cooking vessel having a slot near the upper edge thereof and extending for part of the circumference thereof, a cover plate assembly including a cover plate slidably receivable in said slot, means for locking said cover plate assembly in position upon the vessel, and means for effecting hermetic sealing thereof and comprising a lip, and a resilient lining disposed between said lip and the cover plate, the cover plate having a centrally disposed elliptical aperture, the locking means for the cover plate comprising a locking bar, a valve structure mounted on said bar and adapted to pass through said elliptical aperture, and means on said valve structure to position the cover plate tightly against the vessel and comprising a cam secured to the end of the valve and adapted to cooperate with an inclined surface on the bottom of the cover plate to move said plate upwardly into engagement of its peripheral edge with the edge of the cooking vessel.

11. A pressure cooker comprising a cooking vessel having a slot near the upper edge thereof and extending for part of the circumference thereof; a cover plate assembly including a cover plate slidably receivable in said slot; a locking bar hingedly secured to the cover plate assembly for locking said cover plate assembly in position upon the vessel; a valve structure mounted upon the locking bar; and means for effecting hermetic sealing of the cover plate assembly to the vessel and comprising a flange, and a resilient lining disposed between said flange and the cover plate, and means secured to said valve structure for raising the cover plate to bring the lining and flange into sealing engagement.

AARON BAKST.
SIMON L. RUSKIN.

REFERENCES CITED

The following references are of record in the file of this patent:

UNITED STATES PATENTS

| Number | Name | Date |
|---|---|---|
| 377,124 | Snyder et al. | Jan. 31, 1888 |
| 676,049 | Reay | June 11, 1901 |
| 2,188,735 | Grundstrom | Jan. 30, 1940 |
| 2,458,380 | Horvath | Jan. 4, 1949 |

FOREIGN PATENTS

| Number | Country | Date |
|---|---|---|
| 366,697 | Great Britain | Feb. 11, 1932 |
| 466,986 | Germany | Oct. 15, 1928 |